United States Patent [19]

Rumpakis

[11] Patent Number: 4,479,173
[45] Date of Patent: Oct. 23, 1984

[54] LIGHTED INSTRUMENT ASSEMBLY

[76] Inventor: George E. Rumpakis, 3520A SW. 209th, Aloha, Oreg. 97007

[21] Appl. No.: 546,171

[22] Filed: Oct. 27, 1983

Related U.S. Application Data

[63] Continuation of Ser. No. 487,328, Apr. 21, 1983, abandoned.

[51] Int. Cl.³ .............................................. F21V 29/00
[52] U.S. Cl. .................................. 362/294; 362/293; 362/311; 362/362; 362/363; 362/368; 362/375; 362/455
[58] Field of Search ............... 362/293, 294, 311, 362, 362/363, 368, 375, 455

[56] References Cited

U.S. PATENT DOCUMENTS 4,195,330  3/1980  Savage ............................... 362/226
4,263,072  4/1981  Bull et al. ........................... 362/362
4,318,158  2/1982  Livermore et al. ................. 362/226
4,398,240  8/1983  Savage ............................... 362/226

Primary Examiner—Stephen J. Lechert, Jr.

[57] ABSTRACT

A hollow colored translucent body member has an open base end arranged to receive a light bulb. Such base end has spaced slots and also has an outwardly turned flange arranged to be engaged between a bulb holder and an instrument in which the bulb holder is installed upon friction holding engagement of spring tabs on the bulb holder in outer defining portions of a bulb receiving aperture in an instrument to be lighted. The slots in the body member are dimensioned and arranged to receive the spring tabs on the socket end of the bulb holder. The slots in the base end of the body member have a longitudinal length greater than the length of the spring tabs on the bulb holder to provide air spaces for air circulation around a light bulb in the holder.

1 Claim, 4 Drawing Figures

… …

LIGHTED INSTRUMENT ASSEMBLY

This application is a continuation of application Ser. No. 487,328, filed Apr. 21, 1983 now abandoned.

BACKGROUND OF THE INVENTION

This invention relates to a new and novel lighted instrument assemblies.

It is common practice to provide certain instruments with panel or face portions illuminated by colored light. To produce such colored light, it is common practice to dip the bulbs in colored paint or to stretch a covering thereover. It has been found that such types of bulb coverings have an inherent disadvantage in that they frequently vaporize, discolor, or burn off so that the bulb has to be replaced long prior to the useful life of the bulb filament.

Another disadvantage of such existing types of colored bulbs is that frequently the proper bulb is not always available and an operator will install whatever may be at hand, thus providing a non-uniform color arrangement. This is especially true when bulbs are installed on vehicles or the like that are on the road.

SUMMARY OF THE INVENTION

According to the present invention and forming a primary objective thereof, a bulb cover is provided that overcomes the inherent disadvantages of prior structures in that it facilitates adaptation to existing bulb holders and instruments as an attachment and is not a part of the bulb, thus being permanent in nature and allowing the use of conventional uncolored bulbs which can be changed or replaced as necessary.

In carrying out the objectives of the invention, there is provided a hollow colored translucent body member having an open base end and being of a dimension to receive a light bulb through the base end. Such base end has spaced slots therein and an outwardly turned flange arranged to be engaged between a bulb holder and an instrument to which the bulb holder is installed. The spaced slots on the body member are arranged to receive spring tabs on the socket end of the bulb holder which have friction holding engagement in the outer defining portion of a bulb-receiving aperture in an instrument. The slots on the base end of the bulb cover are longer than the length of the tabs on the bulb holder to provide air circulation through the bulb cover and the bulb holder.

The invention will be better understood and additional objects and advantages will become apparent from the following description taken in connection with the accompanying drawing.

DETAILED DESCRIPTION OF A PREFERRED EMBODIMENT

Figure 1:
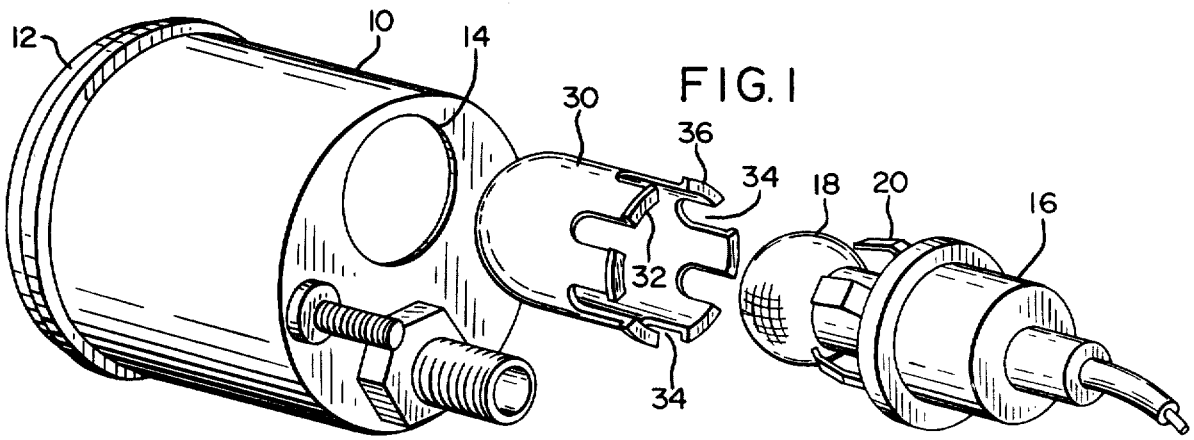
FIG. 1 is a perspective view of a conventional bulb holder and instrument and also a bulb cover of the invention arranged for use therewith, these parts being shown in exploded disassembled relation.
Figure 2:
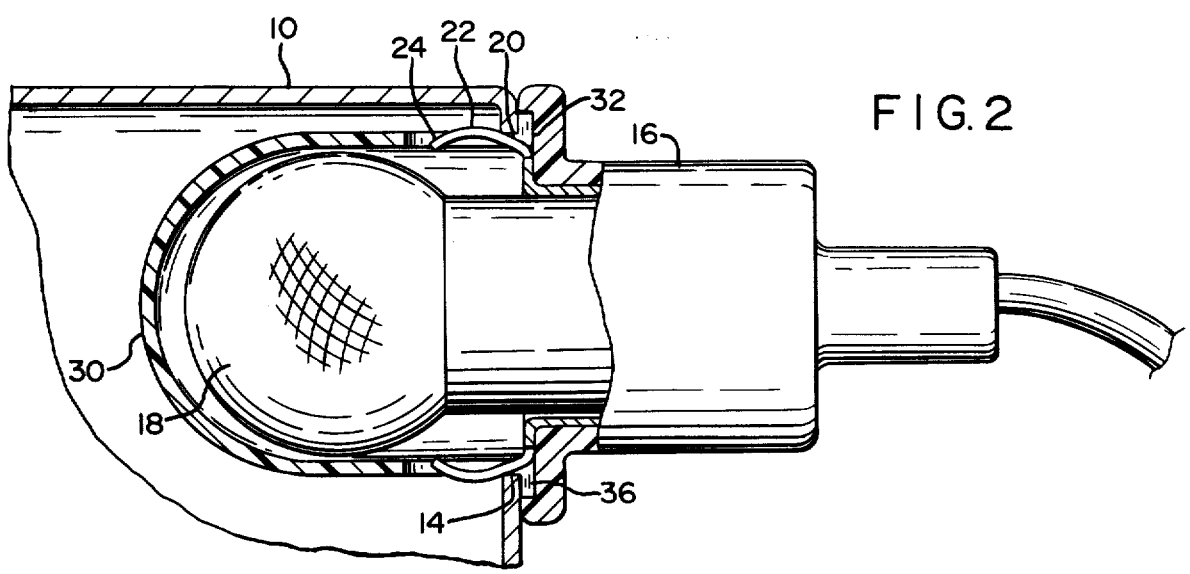
FIG. 2 is an enlarged fragmentary side elevational view of the elements of FIG. 1 but in assembled relation, this view being broken away to show structural details.

With particular reference to the drawings, and first to FIGS. 1 and 2, the numeral 10 designates a conventional instrument having a face portion 12 which is to be lighted. The instrument 10 has one or more apertures 14 for removably supporting a bulb holder 16 having the usual socket for removable engagement of a light bulb holder 18. The bulb receiving end of the bulb holder has projecting spring tabs 20 with a curvature providing an intermediate outwardly projecting rounded ridge 22. The diameter of the bulb holder at the ridges 22 is slightly larger than the diameter of the aperture 14 whereby the holder 16 is attached by pushing it through the aperture and snapping it into place. The free ends 24 of the tabs 20 are bent inwardly for easy guiding of the holder into the aperture.

Figure 3:
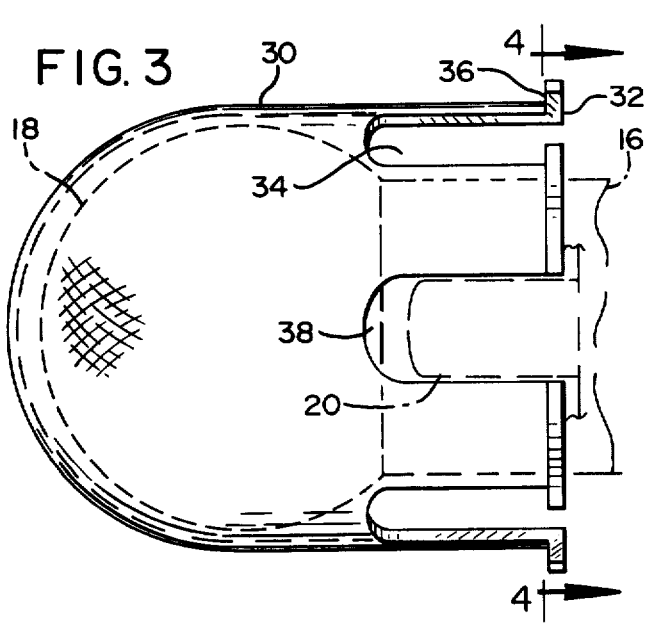
FIG. 3 is an enlarged side elevational view of the bulb cover of the invention, a portion of a bulb holder and bulb being shown in broken lines.
Figure 4:
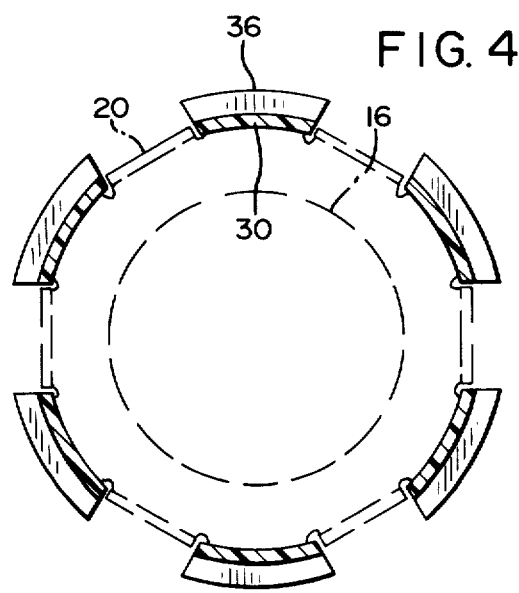
FIG. 4 is a sectional view taken on the line 4—4 of FIG. 3.

According to the present invention, a hollow bulb cover 30, also seen in FIGS. 3 and 4, is provided which is of a diameter to project through aperture 14 and which is molded from a colored plastic or an otherwise permanently colored material. A clear plastic with coloring therein provides a satisfactory illumination for the invention since it provides a translucent effect which emits sufficient light to illuminate the face of the instrument but which at the same time is pleasing to the eye.

The bulb cover 30 has an open base end 32 arranged to receive a bulb 18 for projection into the cover. This base end has slots 34 therearound leading in from the base end and spaced from each other in a specific arrangement so as to receive the spring tabs 20 of the light bulb holder 16. Base end 32 has a flange 36 which projects radially outwardly, and this flange forms an outer diameter at the base end of the bulb cover which is greater than the diameter of the aperture 14 whereby to limit inward movement of the bulb cover through the aperture 14. In the assembled condition of the bulb holder and bulb cover in the instrument, flange 36 is engaged between the rear surface of the instrument and the bulb holder in the areas between the spring tabs 20.

In a preferred arrangement, the slots 34 are longer than the spring tabs 20 so as to form spaces 38 as shown in FIG. 3, at the ends of the spring tabs. Spaces 38 allow a circulation of cooling air around the bulb.

The present bulb cover is readily applied to the instrument 10 by first inserting it in the aperture 14 and then snapping the bulb holder 16 into place, thus holding the bulb cover securely in fully contained position in the instrument. Such bulb cover can remain permanently in position as desired, and bulbs can be replaced without affecting the colored illumination of the instrument face.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A lighted instrument assembly comprising
  a housing having a face portion at one end and a bulb receiving aperture at the other end,
  a bulb holder having a socket end for removably receiving a light bulb,
  a plurality of spaced spring tabs projecting from the socket end of said bulb holder and frictionally engageable in said bulb receiving aperture for holding said bulb holder on said housing with the end of the bulb holder adjacent the end of said housing and the light bulb projecting into said instrument, a hollow colored translucent body member projecting through said bulb receiving aperture into said housing, said body member having an open base end and being of a dimension to receive a light bulb in said bulb holder through said base end thereof, said base end of said body member having spaced slots therearound extending toward the other end of said body member and dimensioned and arranged to receive the spring tabs on the socket end of said bulb holder when the latter is mounted on the housing, said body member having a radial outwardly turned flange on said base end of a diameter greater than the diameter of said bulb receiving aperture whereby to limit inward movement of said body member in said aperture and also to provide clamped mounted engagement thereof between the socket end of said bulb holder and said other end of the housing, said slots in the base end of said body member being longer than said flexible tabs on said bulb holder to provide openings which allow air circulation through said bulb cover and said bulb holder.

* * * * *